United States Patent
Thomsen et al.

(10) Patent No.: US 11,429,388 B2
(45) Date of Patent: Aug. 30, 2022

(54) PARALLEL LOAD OF MAPPING CONTAINERS FOR DATABASE SYSTEM START AND RESTART OPERATIONS

(71) Applicant: SAP SE, Walldorf (DE)

(72) Inventors: Dirk Thomsen, Heidelberg (DE);
Thorsten Glebe, Leimen (DE); Tobias Scheuer, Bruchsal (DE); Werner Thesing, Lautertal (DE); Johannes Gloeckle, Nussloch (DE)

(73) Assignee: SAP SE, Walldorf (DE)

( * ) Notice: Subject to any disclaimer, the term of this patent is extended or adjusted under 35 U.S.C. 154(b) by 162 days.

(21) Appl. No.: 16/883,241

(22) Filed: May 26, 2020

(65) Prior Publication Data

US 2021/0373893 A1 Dec. 2, 2021

(51) Int. Cl.
*G06F 9/30* (2018.01)
*G06F 16/28* (2019.01)
*G06F 9/38* (2018.01)
*G06F 9/54* (2006.01)

(52) U.S. Cl.
CPC ........ *G06F 9/30123* (2013.01); *G06F 9/3836* (2013.01); *G06F 9/544* (2013.01); *G06F 16/289* (2019.01)

(58) Field of Classification Search
CPC .... G06F 9/30123; G06F 9/3836; G06F 9/544; G06F 16/289; G06F 16/24532; G06F 16/254; G06F 11/1438; G06F 11/1448; G06F 16/25
See application file for complete search history.

(56) References Cited

U.S. PATENT DOCUMENTS

| | | | | |
|---|---|---|---|---|
| 5,983,213 A | * | 11/1999 | Nakano | G06F 16/2219 |
| 2005/0050092 A1 | * | 3/2005 | Jain | G06F 16/86 |
| 2014/0237004 A1 | * | 8/2014 | Schreter | G06F 16/215 707/813 |
| 2018/0336073 A1 | | 11/2018 | Kolachala et al. | |

OTHER PUBLICATIONS

Barclay, T. et al., "Loading Databases Using Dataflow Parellelism," SIGMOD Record, ACM, New York, NY, vol. 23, No. 4, (Dec. 1, 1994), 12 pages.
Sridhar, K.T. et al., "Optimising Database Load and Extract for Big Data Era," Advances in Intelligent Data Analysis XIX. Springer, vol. 8422, (Jan. 1, 2014) 10 pages.
Extended European Search Report for EP Application No. 21174135. 0, dated Oct. 21, 2022, 11 pages.

* cited by examiner

*Primary Examiner* — Farley Abad
(74) *Attorney, Agent, or Firm* — Mintz Levin Cohn Ferris Glovsky and Popeo, P.C.

(57) ABSTRACT

Aspects of the current subject matter are directed to an approach in which a parallel load operation of file ID mapping containers is accomplished at start and/or restart of a database system. Parallel load operation of file ID mapping and/or large binary object (LOB) file ID mapping is done among a plurality of scanning engines into a plurality of data buffers that are associated with each of the plurality of scanning engines. Each scanning engine operates on a certain path of a page chain of a page structure including the mapping, causing the page chain to be split among scanning engines to process maps. Contents of the data buffers are pushed to mapping engines via a queue. The mapping engines load the file ID mapping and the LOB file ID mapping into maps for in-system access.

18 Claims, 7 Drawing Sheets

PARALLEL LOAD OF MAPPING CONTAINERS FOR DATABASE SYSTEM START AND RESTART OPERATIONS

FIELD

The present disclosure generally relates to improving start and restart time of database systems and, more specifically, to a parallel load operation of mapping containers for improved start and restart time of database systems.

BACKGROUND

Database management systems have become an integral part of many computer systems. Some systems handle hundreds if not thousands of transactions per second, and some systems perform very complex multidimensional analysis on data. Duration of start and restart times for such systems is a critical factor affecting customers.

SUMMARY

Methods, systems, and articles of manufacture, including computer program products, are provided for a parallel load operation of file identifier (ID) mapping containers for start and/or restart of database systems, such as database cloud systems.

According to an aspect, a computer-implemented method includes scanning, from remote memory and by a first scanning engine into a plurality of buffers, first data, where each of the plurality of buffers receives a dedicated portion of the first data; loading, from a first buffer of the plurality of buffers into a first memory queue and in response to a determination that the first buffer is full, a first dedicated portion of the first data, where a database system includes the plurality of buffers and the first memory queue; and transferring, by a first mapping engine into a first map of in-memory storage of the database system and in response to a determination that the first memory queue is full, contents of the first memory queue, where the contents of the first memory queue include the first dedicated portion of the first data from the first scanning engine and at least a first dedicated portion of second data from a second scanning engine, where the first data and the second data include mapping data.

According to an inter-related aspect, a system includes at least one data processor and at least one memory storing instructions which, when executed by the at least one data processor, result in operations including scanning, from remote memory and by a first scanning engine into a plurality of buffers, first data, where each of the plurality of buffers receives a dedicated portion of the first data; loading, from a first buffer of the plurality of buffers into a first memory queue and in response to a determination that the first buffer is full, a first dedicated portion of the first data, where a database system includes the plurality of buffers and the first memory queue; and transferring, by a first mapping engine into a first map of in-memory storage of the database system and in response to a determination that the first memory queue is full, contents of the first memory queue, where the contents of the first memory queue include the first dedicated portion of the first data from the first scanning engine and at least a first dedicated portion of second data from a second scanning engine, where the first data and the second data include mapping data.

According to an inter-related aspect, a non-transitory computer-readable storage medium includes program code, which when executed by at least one data processor, causes operations including scanning, from remote memory and by a first scanning engine into a plurality of buffers, first data, where each of the plurality of buffers receives a dedicated portion of the first data; loading, from a first buffer of the plurality of buffers into a first memory queue and in response to a determination that the first buffer is full, a first dedicated portion of the first data, where a database system includes the plurality of buffers and the first memory queue; and transferring, by a first mapping engine into a first map of in-memory storage of the database system and in response to a determination that the first memory queue is full, contents of the first memory queue, where the contents of the first memory queue include the first dedicated portion of the first data from the first scanning engine and at least a first dedicated portion of second data from a second scanning engine, where the first data and the second data include mapping data.

In some variations, one or more of the features disclosed herein including the following features can optionally be included in any feasible combination. The remote memory may be external to the database system, and the first scanning engine and the second scanning engine may interface with the remote memory. The mapping data may include file identifier mapping data and/or large binary object file identifier mapping data. The first memory queue may include a single-in all-out queue. A second dedicated portion of the first data may be loaded from a second buffer of the plurality of buffers into a second memory queue and in response to a determination that the second buffer is full; and contents of the second memory queue may be transferred by a second mapping engine into a second map of the in-memory storage of the database system and in response to a determination that the second memory queue is full. The contents of the second memory queue may include the second dedicated portion of the first data from the first scanning engine and at least a second dedicated portion of the second data from the second scanning engine. Loading of the first dedicated portion of the first data and the loading of the second dedicated portion of the first data may be done in separate, parallel threads. A second dedicated portion of the first data may be loaded from a second of the plurality of buffers into a second memory queue and in response to a determination that the second of the plurality of buffers is full; and contents of the second memory queue may be transferred by the first mapping engine into the first map of the in-memory storage and in response to a determination that the second memory queue is full. The contents of the second memory queue may include the second dedicated portion of the first data from the first scanning engine and at least a second dedicated portion of the second data from the second scanning engine. A request related to access of the mapping data may be received by the database system and from a client device; and the request may be processed by the database system by at least accessing the mapping data in the first map of the in-memory storage. The dedicated portion of the first data may be based on one or more attributes of the first data.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
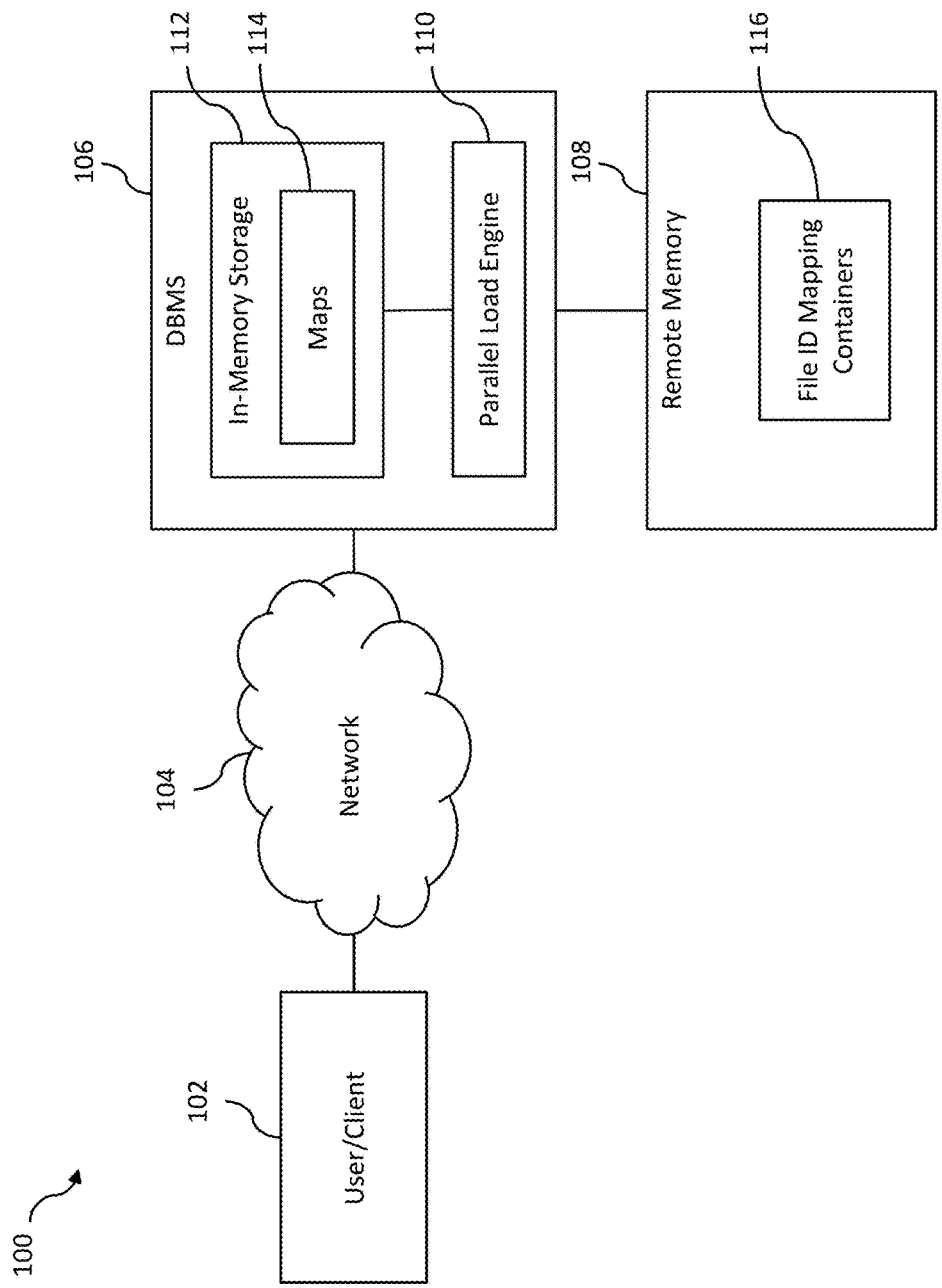
FIG. 1 is a system diagram illustrating a data storage system in which implementations of the current subject matter may be employed.

Like labels are used to refer to same or similar items in the drawings.

DETAILED DESCRIPTION

Aspects of the current subject matter are directed to loading of mapping containers, such as file identifier (ID) mapping containers, at system start or restart for database systems. In some database systems, such as cloud database systems, a large share of start and restart time may be attributed to loading mapping containers from persistent storage (e.g., remote, persistent storage such as disk-based storage) to an in-system memory. The mapping containers may include directory information, that may be in the form of a hierarchical structure of directories and files, needed for operation of the database system. The mapping containers may include a page chain that is needed to be read at start and/or restart and filled in different transient maps to provide a type of transient index. For example, the mapping containers may include file ID mapping and large binary object (LOB) file ID mapping that are needed to access files and LOBs. Database systems with large amounts of virtual file LOBs or mid-size LOBs affect filed ID mapping and/or LOB file ID mapping and contribute to start and restart times due to the amount of load mapping that needs to be accomplished at start and restart.

Existing solutions address the loading of mapping containers by scanning in a single thread, during startup, file ID mapping and LOB file ID mapping. The scanning operation creates the transient maps that are necessary for operation (e.g., online operation including access of the files and LOBs) of the database system. However, the traditional scanning and building of the maps results in high load times, especially in database systems with a large number of virtual file LOBs or mid-size LOBs. In some instances, a database system may include billions of LOBs, resulting in load times of multiple hours. The high load time is caused by the single thread nature of loading the data from the mapping containers to the maps; one thread is used to scan the page structure, and for each entry in the page chain, the information is added to the maps.

Implementations of the current subject matter are directed to an approach in which a parallel load operation of file ID mapping containers is accomplished at start and/or restart of a database system, such as a database cloud system. In particular, aspects of the current subject matter provide for a parallel load operation of the file ID mapping and the LOB file ID mapping among a plurality of scanning engines into a plurality of data buffers that are associated with each of the plurality of scanning engines. Each scanning engine operates on a certain path of the page chain, causing the page chain to be split among the scanning engines to process the maps. Contents of the data buffers are pushed to mapping engines via a queue. The mapping engines load the file ID mapping and the LOB file ID mapping into maps for in-system access. Additional details are provided herein.

While the description provided herein may refer to file ID mapping and LOB file ID mapping, implementations are not limited to such particular types of mapping data. For example, implementations of the current subject matter may be applicable to various mapping containers that need to be loaded from disk to in-system memory. Moreover, while the description provided herein may refer to both file ID mapping and LOB file ID mapping, implementations are not limited to both types of mapping data.

FIG. 1 illustrates a system diagram illustrating an exemplary data storage system 100, according to some implementations of the current subject matter. The system 100 may include a database management system (DBMS) 106, a remote memory 108 (e.g., a persistent storage), and a user/client 102. In some implementations, the remote memory 108 may be configured to store file ID mapping and large binary object (LOB) file ID mapping in, for example, file ID mapping containers 116.

The remote memory 108 may be communicatively coupled with the database management system 106 that may include a parallel load engine 110 and in-memory storage 112. The in-memory storage 112 may include maps 114 that contain the file ID mapping and LOB file ID mapping that are loaded via the parallel load engine 110 from the file ID mapping containers 116 of the remote memory 108. The database management system 106 may be configured to respond to requests from one or more users/clients 102 of the data storage system 100. The users/clients 102 may communicate with the database management system 106 via a network 104, which may be any wired and/or wireless network including, for example, a public land mobile network (PLMN), a wide area network (WAN), a local area network (LAN), a virtual local area network (VLAN), the Internet, and/or the like. The users/clients 102 may send to the database management system 106 a request that requires access to one or more files and/or LOBs the location of which is contained in the maps 114 of the in-memory storage 112. Consistent with implementations of the current subject matter, the parallel load engine 110 implements a process to load the file ID mapping and the LOB file ID mapping into the maps 114. The loading of the file ID mapping and the LOB file ID mapping from remote memory 108 to in-memory storage 112 may occur at start time and/or restart time of the database management system 106.

Figure 2:
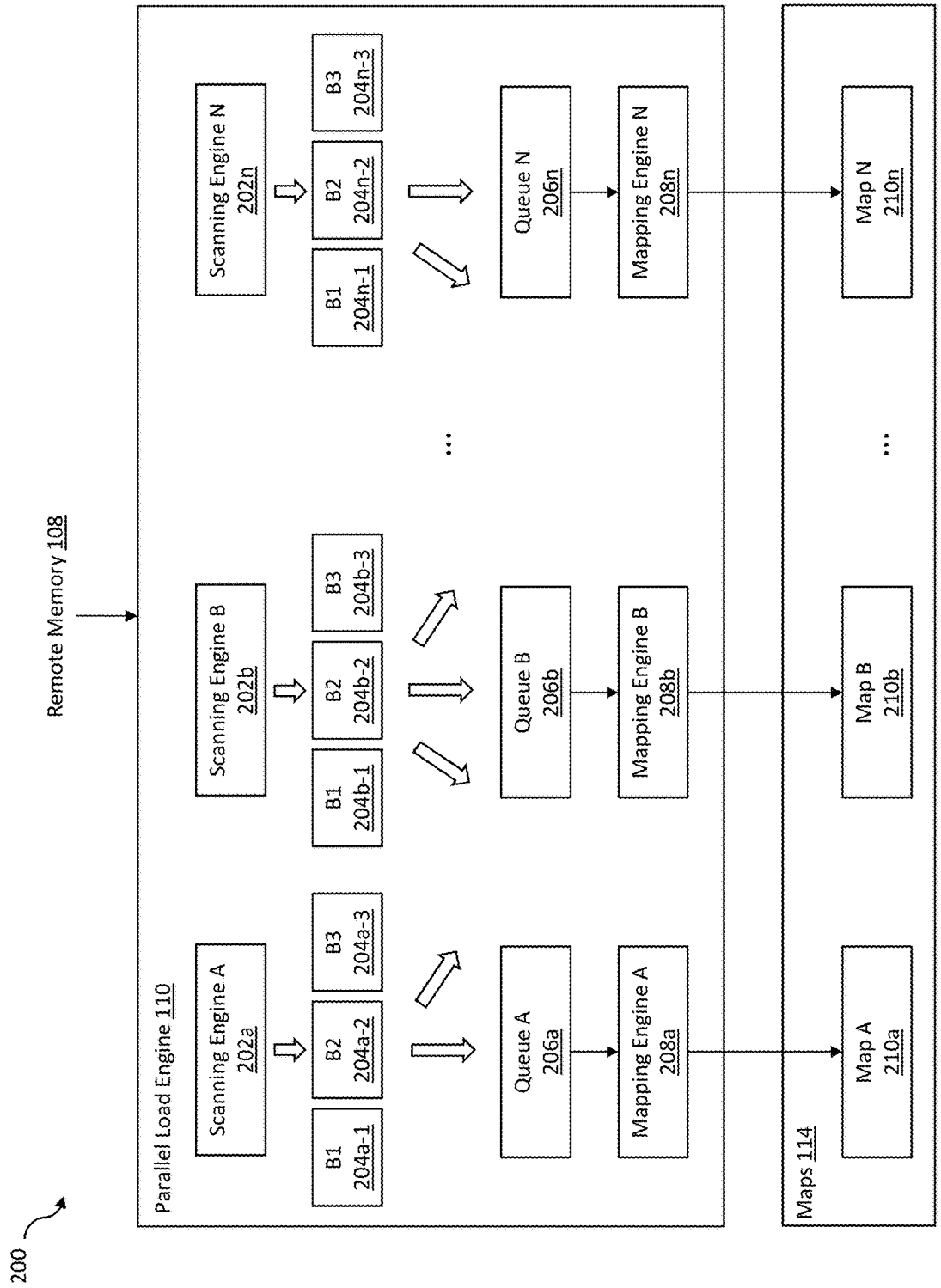
FIG. 2 is a block diagram illustrating features of a parallel load engine consistent with implementations of the current subject matter.

FIG. 2 is a block diagram 200 illustrating features of the parallel load engine 110 consistent with implementations of the current subject matter. The parallel load engine 110 interfaces with the remote memory 108 to access the file ID mapping and the LOB file ID mapping in the file ID mapping containers 116. Consistent with implementations of the current subject matter, the file ID Mapping and the LOB file ID mapping may be in the form of a page structure including a page chain. The parallel load engine 110 operates to transfer, in a parallel load operation at system start and/or restart, the file ID mapping and the LOB file ID mapping to the maps 114 in the in-memory storage 112 of the database management system 106. The transfer of the file ID mapping and the LOB file ID mapping allows for processing requests (e.g., from the users/clients 102) related to access of files associated with the file ID mapping and/or LOBs associated with the LOB file ID mapping. In some implementations, each map includes a particular one or more types of files and/or LOBs. For example, one map may include LOBs belonging to or having a particular attribute.

As shown in FIG. 2, the parallel load engine 110 includes scanning engines 202, buffers 204, queues 206, mapping engines 208, and maps 210. Shown are scanning engines A (202a), B (202b), and N (202n), each having three respective buffers B1 (204a-1), B2 (204a-2), B3 (204a-3); B1 (204b-1), B2 (204b-2), B3 (204b-3); and B1 (204n-1), B2 (204n-2), B3 (204n-3), respectively. Additionally shown are queues A (206a), B (206b), and N (206n) with respective mapping engines A (208a), B (208b), and N (208n) and respective maps A (210a), B (210b), and N (210n). The numbers of scanning engines 202, buffers 204, queues 206, mapping engines 208, and maps 210 shown in FIG. 2 is purely exemplary and for illustrative purposes only.

According to aspects of the current subject matter, each scanning engine 202 reads (e.g., scans) from the remote memory 108 a corresponding portion of the file ID mapping and/or the LOB file ID mapping (e.g., a portion of the page structure) contained in the file ID mapping containers 116. Each scanning engine 202 may, in some implementations, read an equal portion of the file ID mapping and/or the LOB file ID mapping. Various parameters related to, for example, the size and/or the type of the file ID mapping and/or the LOB file ID mapping and/or the capabilities of the scanning engines 202, the buffers 204, the queues 206, and/or the mapping engines 208 may be used to determine the number of scanning engines 202 included in the parallel load engine 110. This in turn may be used to determine the distribution of the file ID mapping and/or the LOB file ID mapping among the scanning engines 202. Consistent with implementations of the current subject matter, the number of scanning engines 202 may be determined by the number of pages in the page chain, which is a previously known value. The distribution of data within the mappings may be used to determine striping for the maps 210. According to aspects of the current subject matter, the maps 210 may also be striped, resulting in, for example, one queue (e.g., 206a) and one mapping engine (208a) for each of the stripes of a map (e.g., map A 210a).

Each scanning engine 202 is associated with a plurality of buffers 204. The scanning engine 202 transfers a portion of the read (e.g., scanned) file ID mapping and/or LOB file ID mapping to each buffer 204. That is, among the buffers B1 (204a-1), B2 (204a-2), B3 (204a-3) is distributed the file ID mapping and the LOB file ID mapping that was read by the scanning engine A 202a.

The queues A (206a), B (206b), and N (206n), consistent with implementations of the current subject matter, each receive data (e.g., the file ID mapping and/or the LOB file ID mapping) from one buffer 204 associated with each of the scanning engines 202. For example, data from queue A 206a includes the buffer data from buffers B1 204a-1, B1 204b-1, and B1 204n-1. According to aspects of the current subject matter, the queues 206 may be single-in all-out (SIAO) queues. SIAO queues allow for transfer in of data in individual and/or separate segments or pieces, while all of the data contained in the queue is transferred out in one stream. According to aspects of the current subject matter, the number of inserts into the queues 206 may be adjusted by having larger or smaller amounts of data from the buffers 204 transferred to the queues.

Consistent with implementations of the current subject matter, once a particular buffer 204 is full, the data from that buffer 204 is moved to its respective queue 206. Data continues to be scanned by the scanning engines 202 into the buffers 204 across all of the buffers 204, and is then pushed to the queues 206. This movement of data results in a parallel load transfer of data among the queues 206. In particular, each of the scanning engines 202 receives a portion of data, which is then separated among the buffers 204, which is then distributed among the queues 206, with each of the scanning engines 202 operating as their own separate thread.

The queues 206 are each associated with a respective mapping engine 208. The mapping engines 208 consume the data contained in the queues 206, and populate the maps 210 with the consumed data. The mapping engines 208 are each associated with a respective map 210. Each map 210 may include a particular one or more types of files and/or LOBs. For example, one map may include LOBs belonging to or having a particular attribute or set of attributes. In some implementations, the number of maps 210 for a database management system 106 is set based on, for example, the number and/or types of files and/or LOBs. The scanning engine 202 may operate to move certain segments of the page chain (e.g., the file ID mapping and the LOB file ID mapping) based on one or more attributes associated with the maps 210. That is, the scanning engine 202 operates to transfer the data such that the file ID mapping and the LOB file ID mapping with a particular one or more attributes is moved to a respective map 210. According to aspects of the current subject matter, the number of maps 210 is fixed and based on, for example, the type of information necessary for the various operations on the files and/or LOBs.

Figure 3:
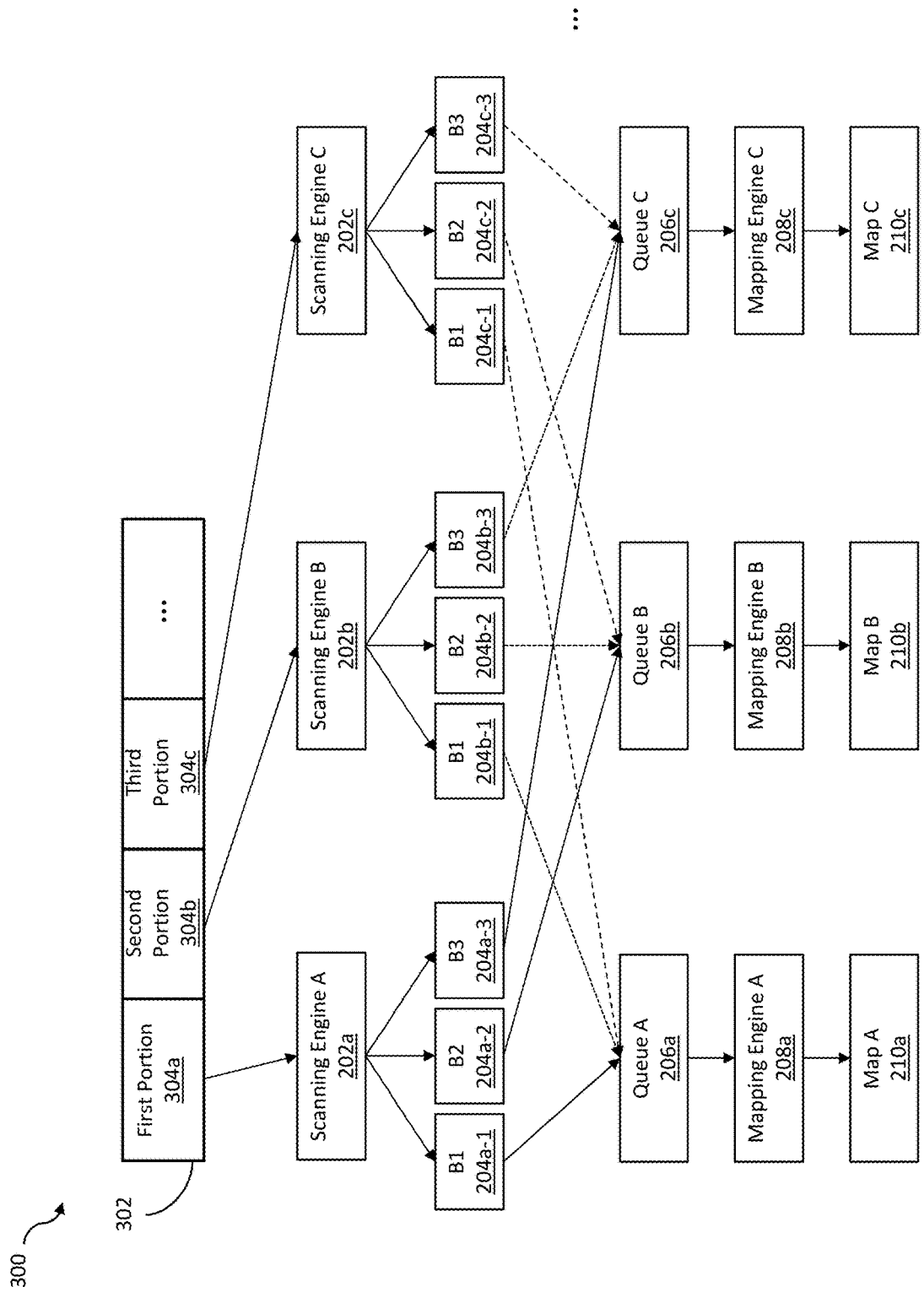
FIG. 3 is a block diagram illustrating aspects of a parallel load operation consistent with implementations of the current subject matter.

FIG. 3 is a block diagram illustrating aspects of a parallel load operation 300 consistent with implementations of the current subject matter. A page structure 302, which includes, according to aspects of the current subject matter, the file ID mapping and/or the LOB file ID mapping, may be a page chain and may be allocated as a first portion 304a, a second portion 304b, a third portion 304c, and so on. The page structure 302 may be stored in the file ID mapping containers 116 of the remote memory 108.

Each scanning engine 202 is associated with a particular portion of the page structure 302 and operates to scan the associated portion 304 and distribute it among the buffers 204 associated with the scanning engine 202. For example, as shown in FIG. 3, the scanning engine A 202a scans the first portion 304a and distributes it among the buffers B1 (204a-1), B2 (204a-2), B3 (204a-3). The distribution of the first portion 304a among the buffers 204 may be based on one or more attributes of the file ID mapping and the LOB file ID mapping. For example, the file ID mapping and the LOB file ID mapping may be split or distributed among the buffers 204 such that the mappings with like attributes are destined for the same map 210.

As a particular buffer 204 reaches a full state, containing a dedicated share or portion of the data that makes up a portion of the page structure (e.g., page chain) from the scanning engine 202, the contents of the buffer 204 are moved to its respective queue 206. For example, the contents of the buffer 204 may be moved to a particular queue 206 associated with a map 210 that is in turn associated with one or more of the same attributes as the attributes of the file ID mapping and the LOB file ID mapping in the buffer 204. Consistent with implementations of the current subject matter, each buffer 204 is dedicated to a particular one of the queues 206 and a corresponding one of the maps 210.

Aspects of the current subject matter provide for the parallel transfer of data among the buffers 204 and to the queues 206. When a buffer 204 is full, its content is transferred to its respective queue 206, allowing for the scanning engine 202 to add more data to the buffer 204. This process is repeated in parallel across the scanning engines 202, the buffers 204, and the queues 206.

With continued reference to FIG. 3, the contents of buffers B1 204a-1, 204b-1, and 204c-1 are transferred to queue A 206a, while the contents of buffers B2 204a-2, 204b-2, and 204c-2 are transferred to queue B 206b, and the contents of buffers B3 204a-3, 204b-3, and 204c-3 are transferred to queue C 206c. When the buffers 204 are queued at the queues 206, the mapping engines 208 (in parallel, separate threads) consume the contents of the queues 206. This frees up the queues 206, allowing for the data from the buffers 204 to be transferred to the queues 206, until the page structure 302 is properly allocated among the maps 210.

According to aspects of the current subject matter, as each scanning engine (e.g., the scanning engine 202a) fills only its local buffers (in this example, the buffers B1 204a-1, B2 204a-2, and B3 204a-3), there is no synchronization necessary on the buffers. Each of the buffers (in this example, the buffer B2 204a-2) is assigned to one of the mappings (in this example, the map B 210b), which is filled by the mapping engine (in this example, the mapping engine B 208b) by its associated processing queue (in this example, the queue B 206b). The only point of contact between the scanning engine and the mapping engine is the RAO queue (in this example, the queue B 206b) implemented by, for example, cloud application service (CAS) operations. The scanning engine may add a single buffer to that queue if the buffer is full, while the mapping engine will retrieve the complete list of buffers after it has processed the previous one.

In some implementations, multiple queues 206 and multiple mapping engines 208 may be associated with a given map 210. For example, rather than a map 210 being associated with a single mapping engine 208 and queue 206, the map 210 may be loaded by two or more pairs of queues 206 and mapping engines 208. The loading of the map 210 may be done as parallel, separate threads from each of its associated mapping engines 208.

Figure 4:
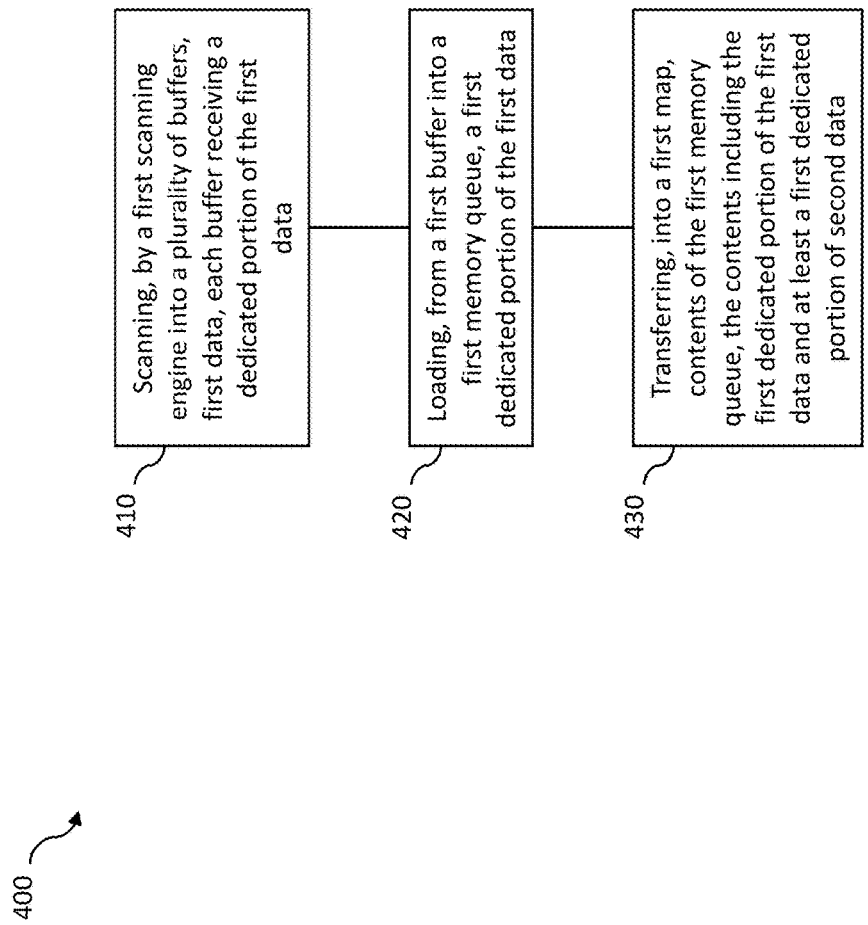
FIG. 4 depicts a flowchart illustrating a process for a parallel load operation consistent with implementations of the current subject matter.

FIG. 4 depicts a flowchart 400 illustrating a process for a parallel load operation consistent with implementations of the current subject matter.

At 410, a first scanning engine may scan first data from remote memory into a plurality of buffers. For example, the scanning engine A 202a may scan a first portion of a page chain of data from the remote memory 108 including the file ID mapping containers 116, into the buffers B1 204a-1, B2 204a-2, and B3 204a-3. The first portion of the page chain of data may be the first portion 304a from the page structure 302 and may include file ID mapping and LOB file ID mapping to be inserted into a map 210 to provide for database operations that require the mapping data. According to aspects of the current subject matter, the buffers 204 receive a dedicated portion of the first data (e.g., of the first portion of the page chain). For example, the dedicated portion may be based on one or more attributes of the first portion of data. In some instances, the distribution of the first portion 304a among the buffers 204 may be based on one or more attributes of the file ID mapping and the LOB file ID mapping. For example, the file ID mapping and the LOB file ID mapping may be split or distributed among the buffers 204 such that the mappings with like attributes are destined for and routed to the same map 210.

At 420, a first dedicated portion of the first data may be loaded into a first memory queue. For example, the first dedicated portion may be from the first buffer B1 204a-1 and may be loaded into the memory queue A 206a when, for example, the first buffer B1 204a-1 is full. Consistent with implementations of the current subject matter, data transfer of the page structure 302 among the buffers 204 and to the queues 206 may occur in parallel but separate threads. For example, the contents of the buffer B1 204a-1 may be loaded into the queue A 206a at a different time than the contents of the buffer B1 204b-1, and both may be loaded into the queue A 206a at different times than the contents of the buffer B1 204c-1.

At 430, a first mapping engine may transfer into a first map contents of the first memory queue. For example, the mapping engine A 208a may consume the contents of the memory queue A 206a into the map 210a in response to a determination that the memory queue A 206a is full. Consistent with implementations of the current subject matter, the contents of the memory queue A 206a may include the first dedicated portion of the first data from the first scanning engine and at least a first dedicated portion of second data (e.g., a second portion of the page chain) from a second scanning engine. For example, the contents of buffers B1 204a-1, 204b-1, and 204c-1 are transferred to queue A 206a. When the queue A 206a is full, the mapping engine A 208a consumes the contents of the queue A 206a into the map 210a. According to aspects of the current subject matter, a given queue 206 may not, at a given time, have an equal amount of data from each of its associated buffers 204. Rather, the content of the associated buffers 204 is being added to the queue 206 when each buffer 204 is full.

Similarly, the contents of buffers B2 204a-2, 204b-2, and 204c-2 are transferred to queue B 206b. When the queue B 206b is full, the mapping engine B 208b consumes the contents of the queue B 206b into the map 210b.

Consistent with implementations of the current subject matter, loading of the first dedicated portion of the first data (e.g., the first portion of the page chain) and loading of the second dedicated portion of the first data (e.g., the first portion of the page chain) are done in separate, parallel threads.

Aspects of the current subject matter also provide for receiving by the database management system 106 and from a user/client 102 a request related to access of the mapping data. For example, the user/client 102 may initiate an operation that requires the files and/or LOBs that are mapped according to the file ID mapping and/or the LOB filed ID mapping in the maps 114. In response to the request, the database management system 106 may access the mapping data in the map, such as a first map 210a.

Aspects of the current subject matter thus advantageously provide a parallel load operation approach for file ID mapping and LOB file ID mapping among a plurality of scanning engines into a plurality of data buffers that are associated with each of the plurality of scanning engines. Each scanning engine operates on a certain path of the page chain, causing the page chain to be split among the scanning engines to process the maps. Contents of the data buffers are pushed to mapping engines via a queue. The mapping engines load the file ID mapping and the LOB file ID mapping into maps for in-system access. The parallel but separate data transfer operations between the scanning engines, the buffers, the memory queues, and the maps provide for reduced start time and/or restart time for the database management system.

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 5:
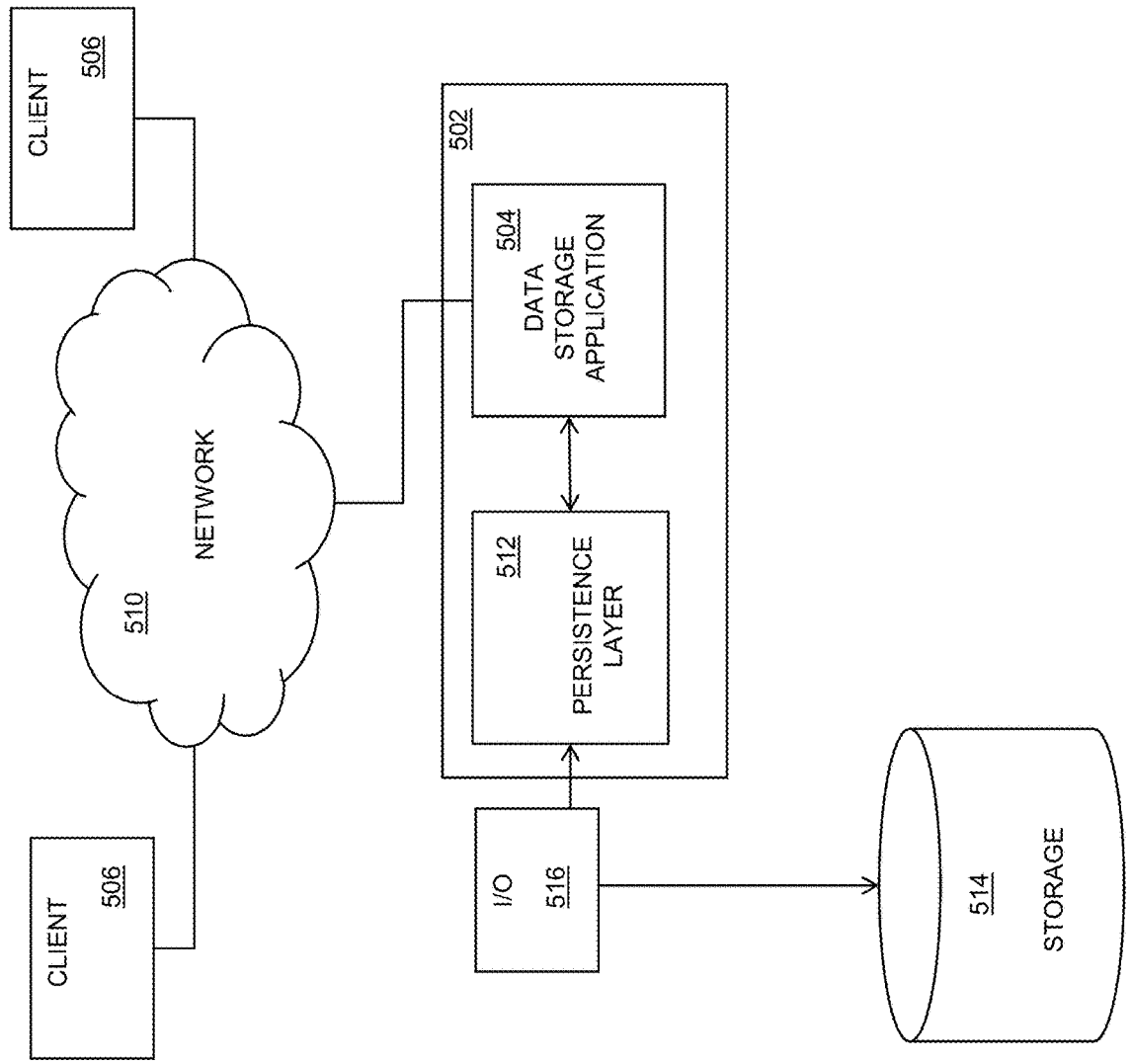
FIG. 5 is a diagram illustrating an exemplary system including a data storage application, according to some implementations of the current subject matter.

FIG. 5 illustrates an exemplary system 500 in which a computing system 502, which may include one or more programmable processors that may be collocated, linked over one or more networks, etc., executes one or more modules, software components, or the like of a data storage application 504, according to some implementations of the current subject matter. The data storage application 504 may include one or more of a database, an enterprise resource program, a distributed storage system (e.g. NetApp Filer available from NetApp of Sunnyvale, Calif.), or the like.

The one or more modules, software components, or the like may be accessible to local users of the computing system 502 as well as to remote users accessing the computing system 502 from one or more client machines 506 over a network connection 510. One or more user interface screens produced by the one or more first modules may be displayed to a user, either via a local display or via a display associated with one of the client machines 506. Data units of the data storage application 504 may be transiently stored in a persistence layer 512 (e.g., a page buffer or other type of temporary persistency layer), which may write the data, in the form of storage pages, to one or more storages 514, for example via an input/output component 516. The one or more storages 514 may include one or more physical storage media or devices (e.g. hard disk drives, persistent flash memory, random access memory, optical media, magnetic media, and the like) configured for writing data for longer term storage. It should be noted that the storage 514 and the input/output component 516 may be included in the computing system 502 despite their being shown as external to the computing system 502 in FIG. 5.

Data retained at the longer term storage 514 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 6:
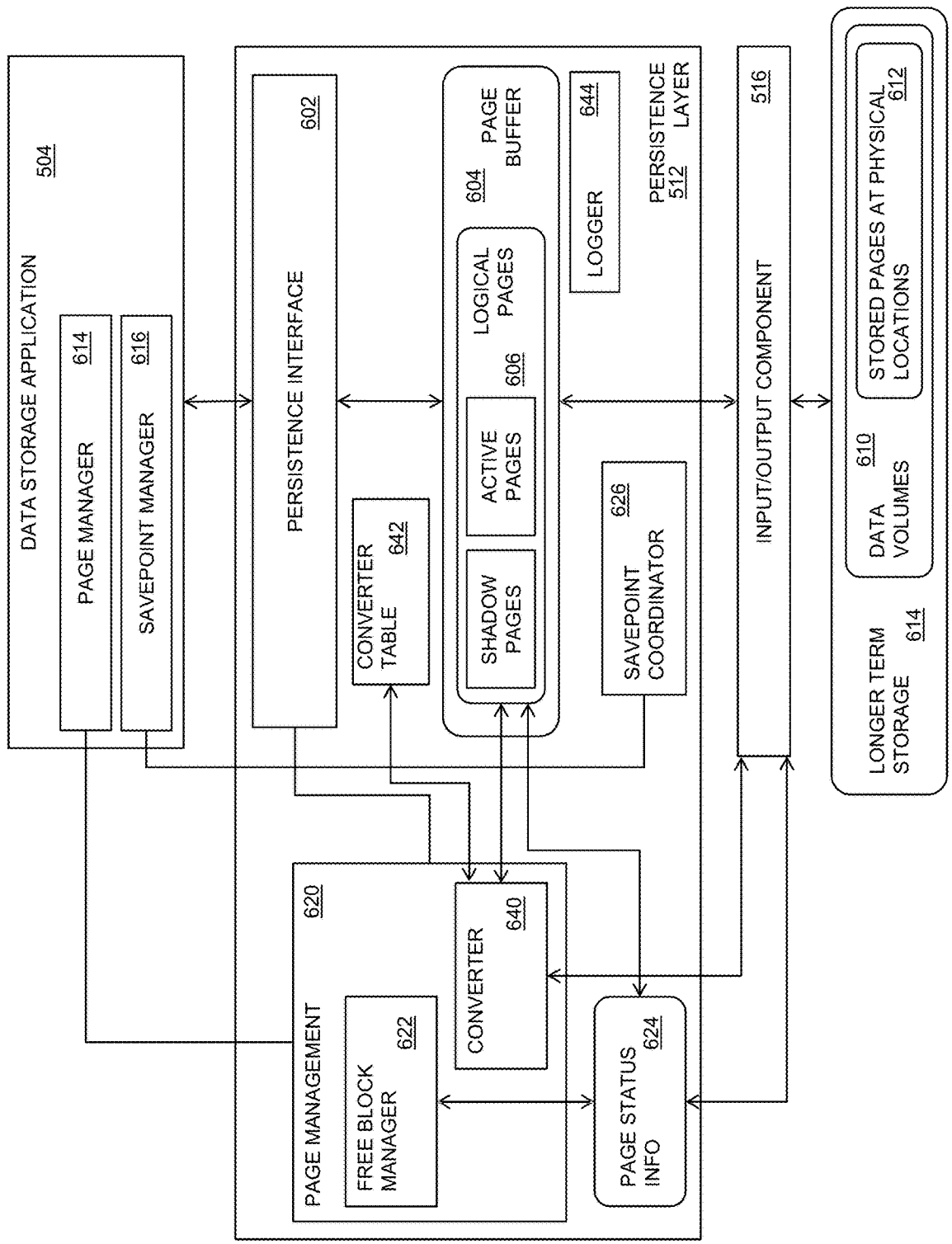
FIG. 6 is a diagram illustrating details of the system of FIG. 5.

FIG. 6 illustrates exemplary software architecture 600, according to some implementations of the current subject matter. A data storage application 504, which may be implemented in one or more of hardware and software, may include one or more of a database application, a network-attached storage system, or the like. According to at least some implementations of the current subject matter, such a data storage application 504 may include or otherwise interface with a persistence layer 512 or other type of memory buffer, for example via a persistence interface 602. A page buffer 604 within the persistence layer 512 may store one or more logical pages 606, and optionally may include shadow pages, active pages, and the like. The logical pages 606 retained in the persistence layer 512 may be written to a storage (e.g. a longer term storage, etc.) 514 via an input/output component 516, which may be a software module, a sub-system implemented in one or more of software and hardware, or the like. The storage 514 may include one or more data volumes 610 where stored pages 612 are allocated at physical memory blocks.

In some implementations, the data storage application 504 may include or be otherwise in communication with a page manager 614 and/or a savepoint manager 616. The page manager 614 may communicate with a page management module 620 at the persistence layer 512 that may include a free block manager 622 that monitors page status information 624, for example the status of physical pages within the storage 514 and logical pages in the persistence layer 512 (and optionally in the page buffer 604). The savepoint manager 616 may communicate with a savepoint coordinator 626 at the persistence layer 512 to handle savepoints, which are used to create a consistent persistent state of the database for restart after a possible crash.

In some implementations of a data storage application 504, the page management module of the persistence layer 512 may implement a shadow paging. The free block manager 622 within the page management module 620 may maintain the status of physical pages. The page buffer 604 may include a fixed page status buffer that operates as discussed herein. A converter component 640, which may be part of or in communication with the page management module 620, may be responsible for mapping between logical and physical pages written to the storage 514. The converter 640 may maintain the current mapping of logical pages to the corresponding physical pages in a converter table 642. The converter 640 may maintain a current mapping of logical pages 606 to the corresponding physical pages in one or more converter tables 642. When a logical page 606 is read from storage 514, the storage page to be loaded may be looked up from the one or more converter tables 642 using the converter 640. When a logical page is written to storage 514 the first time after a savepoint, a new free physical page is assigned to the logical page. The free block manager 622 marks the new physical page as "used" and the new mapping is stored in the one or more converter tables 642.

The persistence layer 512 may ensure that changes made in the data storage application 504 are durable and that the data storage application 504 may be restored to a most recent committed state after a restart. Writing data to the storage 514 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 644 may also be included to store the changes made to the data of the data storage application in a linear log. The logger component 644 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 644 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 512 may use a combination of undo log entries (from one or more logs) and shadow paging.

The persistence interface 602 may handle read and write requests of stores (e.g., in-memory stores, etc.). The persistence interface 602 may also provide write methods for writing data both with logging and without logging. If the logged write operations are used, the persistence interface 602 invokes the logger 644. In addition, the logger 644 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 644. For an entry of type "update", for example, this would be the identification of the affected record and the after image of the modified data.

When the data application 504 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 644 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 644 may write a database log (or simply referred to herein as a "log") sequentially into a memory buffer in natural order (e.g., sequential order, etc.). If several physical hard disks/storage devices are used to store log data, several log partitions may be defined. Thereafter, the logger 644 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 504 may use shadow paging so that the savepoint manager 616 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 7:
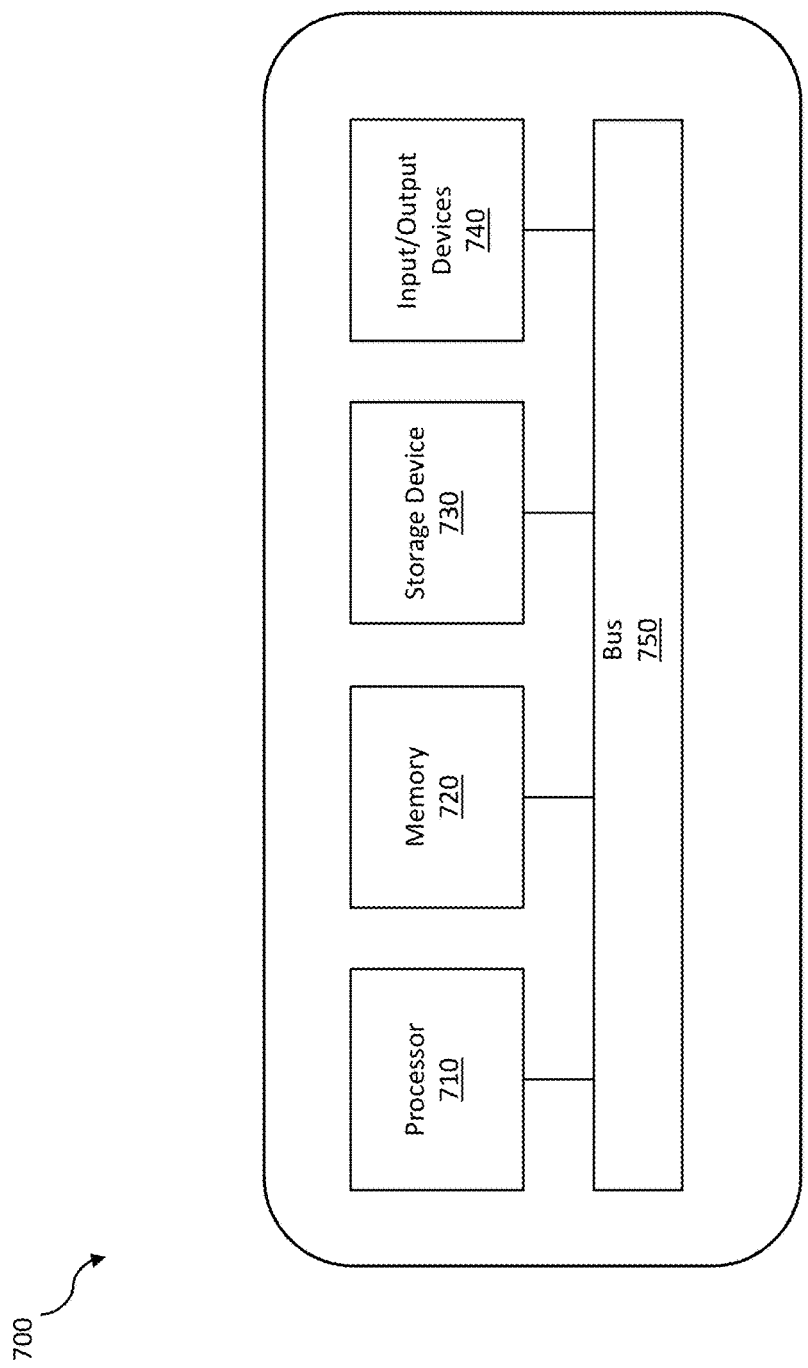
FIG. 7 depicts a block diagram illustrating a computing system consistent with implementations of the current subject matter.

FIG. 7 depicts a block diagram illustrating a computing system 700 consistent with implementations of the current subject matter. In some implementations, the current subject matter may be configured to be implemented in a system 700.

As shown in FIG. 7, the computing system 700 can include a processor 710, a memory 720, a storage device 730, and input/output devices 740. The processor 710, the memory 720, the storage device 730, and the input/output devices 740 can be interconnected via a system bus 750. The processor 710 is capable of processing instructions for execution within the computing system 700. Such executed instructions can implement one or more components of, for example, the system 100. In some implementations of the current subject matter, the processor 710 can be a single-threaded processor. Alternately, the processor 710 can be a multi-threaded processor. The processor 710 is capable of processing instructions stored in the memory 720 and/or on the storage device 730 to display graphical information for a user interface provided via the input/output device 740.

The memory 720 is a computer readable medium such as volatile or non-volatile that stores information within the computing system 700. The memory 720 can store data structures representing configuration object databases, for example. The storage device 730 is capable of providing persistent storage for the computing system 700. The storage device 730 can be a floppy disk device, a hard disk device, an optical disk device, or a tape device, or other suitable persistent storage means. The input/output device 740 provides input/output operations for the computing system 700. In some implementations of the current subject matter, the input/output device 740 includes a keyboard and/or pointing device. In various implementations, the input/output device 740 includes a display unit for displaying graphical user interfaces.

According to some implementations of the current subject matter, the input/output device 740 can provide input/output operations for a network device. For example, the input/output device 740 can include Ethernet ports or other networking ports to communicate with one or more wired and/or wireless networks (e.g., a local area network (LAN), a wide area network (WAN), the Internet).

In some implementations of the current subject matter, the computing system 700 can be used to execute various interactive computer software applications that can be used for organization, analysis and/or storage of data in various (e.g., tabular) format (e.g., Microsoft Excel®, and/or any other type of software). Alternatively, the computing system 700 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be stand-alone computing products and/or functionalities. Upon activation within the applications, the functionalities can be used to generate the user interface provided via the input/output device 740. The user interface can be generated and presented to a user by the computing system 700 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A computer-implemented method, comprising:
   scanning, from remote memory and by a first scanning engine into a plurality of buffers, first data, each of the plurality of buffers receiving a dedicated portion of the first data;
   loading, from a first buffer of the plurality of buffers into a first memory queue and in response to a determination that the first buffer is full, a first dedicated portion of the first data, a database system including the plurality of buffers and the first memory queue;
   loading, from a second buffer of the plurality of buffers into a second memory queue and in response to a determination that the second buffer is full, a second dedicated portion of the first data;
   transferring, by a first mapping engine into a first map of in-memory storage of the database system and in response to a determination that the first memory queue is full, contents of the first memory queue, wherein the contents of the first memory queue comprise the first dedicated portion of the first data from the first scanning engine and at least a first dedicated portion of second data from a second scanning engine, wherein the first data and the second data comprise mapping data; and transferring, by a second mapping engine into a second map of the in-memory storage of the database system and in response to a determination that the second memory queue is full, contents of the second memory queue, wherein the contents of the second memory queue comprise the second dedicated portion of the first data from the first scanning engine and at least a second dedicated portion of the second data from the second scanning engine.

2. The computer-implemented method of claim 1, wherein the remote memory is external to the database system, and wherein the first scanning engine and the second scanning engine interface with the remote memory.

3. The computer-implemented method of claim 1, wherein the mapping data comprise file identifier mapping data and/or large binary object file identifier mapping data.

4. The computer-implemented method of claim 1, wherein the first memory queue comprises a single-in all-out queue.

5. The computer-implemented method of claim 1, wherein the loading of the first dedicated portion of the first data and the loading of the second dedicated portion of the first data are done in separate, parallel threads.

6. The computer-implemented method of claim 1, further comprising:
transferring, by the first mapping engine into the first map of the in-memory storage and in response to a determination that the second memory queue is full, contents of the second memory queue, wherein the contents of the second memory queue comprise the second dedicated portion of the first data from the first scanning engine and at least a second dedicated portion of the second data from the second scanning engine.

7. The computer-implemented method of claim 1, further comprising:
receiving, by the database system and from a client device, a request related to access of the mapping data; and
processing, by the database system, the request by at least accessing the mapping data in the first map of the in-memory storage.

8. The computer-implemented method of claim 1, wherein the dedicated portion of the first data is based on one or more attributes of the first data.

9. A system, comprising:
at least one data processor; and
at least one memory storing instructions which, when executed by the at least one data processor, result in operations comprising:
scanning, from remote memory and by a first scanning engine into a plurality of buffers, first data, each of the plurality of buffers receiving a dedicated portion of the first data;
loading, from a first buffer of the plurality of buffers into a first memory queue and in response to a determination that the first buffer is full, a first dedicated portion of the first data, a database system including the plurality of buffers and the first memory queue;
loading, from a second buffer of the plurality of buffers into a second memory queue and in response to a determination that the second buffer is full, a second dedicated portion of the first data;

transferring, by a first mapping engine into a first map of in-memory storage of the database system and in response to a determination that the first memory queue is full, contents of the first memory queue, wherein the contents of the first memory queue comprise the first dedicated portion of the first data from the first scanning engine and at least a first dedicated portion of second data from a second scanning engine, wherein the first data and the second data comprise mapping data; and transferring, by a second mapping engine into a second map of the in-memory storage of the database system and in response to a determination that the second memory queue is full, contents of the second memory queue, wherein the contents of the second memory queue comprise the second dedicated portion of the first data from the first scanning engine and at least a second dedicated portion of the second data from the second scanning engine.

10. The system of claim 9, wherein the mapping data comprise file identifier mapping data and/or large binary object file identifier mapping data.

11. The system of claim 9, wherein the first memory queue comprises a single-in all-out queue.

12. The system of claim 9, wherein the loading of the first dedicated portion of the first data and the loading of the second dedicated portion of the first data are done in separate, parallel threads.

13. The system of claim 9, the operations further comprising:
transferring, by the first mapping engine into the first map of in-memory storage and in response to a determination that the second memory queue is full, contents of the second memory queue, wherein the contents of the second memory queue comprise the second dedicated portion of the first data from the first scanning engine and at least a second dedicated portion of the second data from the second scanning engine.

14. The system of claim 9, the operations further comprising:
receiving, from a client device, a request related to access of the mapping data; and
processing the request by at least accessing the mapping data in the first map of the in-memory storage.

15. The system of claim 9, wherein the dedicated portion of the first data is based on one or more attributes of the first data.

16. A non-transitory computer-readable storage medium including program code, which when executed by at least one data processor, causes operations comprising:
scanning, from remote memory and by a first scanning engine into a plurality of buffers, first data, each of the plurality of buffers receiving a dedicated portion of the first data;
loading, from a first buffer of the plurality of buffers into a first memory queue and in response to a determination that the first buffer is full, a first dedicated portion of the first data, a database system including the plurality of buffers and the first memory queue;
loading, from a second buffer of the plurality of buffers into a second memory queue and in response to a determination that the second buffer is full, a second dedicated portion of the first data;
transferring, by a first mapping engine into a first map of in-memory storage of the database system and in response to a determination that the first memory queue is full, contents of the first memory queue, wherein the contents of the first memory queue comprise the first dedicated portion of the first data from the first scanning engine and at least a first dedicated portion of second data from a second scanning engine, wherein the first data and the second data comprise mapping data; and transferring, by a second mapping engine into a second map of the in-memory storage of the database system and in response to a determination that the second memory queue is full, contents of the second memory queue, wherein the contents of the second memory queue comprise the second dedicated portion of the first data from the first scanning engine and at least a second dedicated portion of the second data from the second scanning engine.

17. The non-transitory computer-readable storage medium of claim 16, the operations further comprising:

receiving, by the database system and from a client device, a request related to access of the mapping data; and processing, by the database system, the request by at least accessing the mapping data in the first map of the in-memory storage.

18. The non-transitory computer-readable storage medium of claim 16, wherein the dedicated portion of the first data is based on one or more attributes of the first data.

\* \* \* \* \*